United States Patent Office 2,811,450
Patented Oct. 29, 1957

2,811,450

METHOD OF PRODUCING FOOD-PREPARATIONS

Friedrich Petuely, Graz, Austria, assignor to N. V. "Tervalon" Maatschappij voor Voedingsmiddelen op Wetenschappelijke basis (Scientific Food Co.)

No Drawing. Application June 16, 1953,
Serial No. 362,130

Claims priority, application Austria June 17, 1952

4 Claims. (Cl. 99—54)

It is known that the faeces of breast-fed infants is a substantially pure culture of the *Lactobacillus bifidus*, also termed *Bacillus bifidus*, *L-bifidus* or *Bacterium bifidium* Tissier, briefly designated *bifidus* flora. It is commonly held that, if the breast-fed infant has a substantially pure *bifidus* flora, it is in a condition of eutrophy. When a breast-fed infant falls ill, it is usually found that the substantially pure *bifidus* flora is replaced by a so-called mixed flora which resembles the flora of non-breast-fed infants. The presence of a substantially pure *bifidus* flora with infants is regarded as an indication that the infant is in a condition of eutrophy.

Several investigators have attempted to compose a food-preparation which produces a substantially pure *bifidus* flora in the intestine of infants. Such preparations contain inter alia a carbohydrate such as, for example, lactose or dextrine or a mixture of them, as a substratum for the *bifidus* bacteria not yet converted in the stomach and small intestine by the digestive juices—a *bifidus* flora develops substantially in the large intestine—and in addition one or more materials assumed to have a specific effect with respect to the production of a *bifidus* flora. In this connection it may be pointed out that according to Adam "Monatschrift für Kinderheilkunde" vol. 97, pages 500 to 507 (1950) the addition of cystine, lactose and dextrine to food-preparations is a deciding factor for the production of a *bifidus* flora. Petuely has however communicated in "Oesterreichische Zeitschrift für Kinderheilkunde und Kinderfürsorge" vol. 6, pages 173 to 190 (1951) that the addition of lactose alone is not sufficient to develop a *bifidus* flora, nor would this be the case when adding a mixture of lactose and cystine or lactose and cysteine to food-preparations. Put broadly, the problem of developing a substantially pure *bifidus* flora in the intestine of non-breast-fed infants by feeding a special preparation has hitherto not been solved.

The present invention relates to a food product which when fed in a suitable manner to non-breast-fed infants below the age of 6 months forms a substantially pure *L. bifidus* flora in their intestine within 48 hours and at most 96 hours after the first feeding and a method for the preparation of such a food product. The food product of this invention is prepared by mixing with an edible food product a quantity of a lactose conversion product sufficient to form said flora when the lactose-protein quotient of the resultant food product is at least equal to a value exceeding 2.6.

In the present case a *bifidus*-active food-preparation is to be understood to mean a foodstuff which contains a quantity of the *bifidus*-active concentrate corresponding to the aforesaid sufficient quantity.

Said definition of food-preparations includes not only food-preparations for infants but also for older children and adults. The invention is based on the recognition that the said pH-treatment of lactose yields a substance, in the present specification termed *bifidus* factor, which makes a concentrate or food-preparation *bifidus*-active if present in sufficient quantity. Tests on infants permit of determining whether a food-preparation or concentrate contains such a quantity of *bifidus* factor as to make it *bifidus*-active. In order to draw reliable conclusions from the tests it is necessary to subject to these tests several, for example 10, healthy infants whose intestines do not contain a substantially pure *bifidus* flora and which are not older than about 6 months. The infants should not be given food-preparations other than those tested. Furthermore, the feeding should be in agreement with what is normal in feeding non-breast-fed infants. If after the first feeding of infants with the food-preparation having a lactose-protein quotient in excess of 2.6, a substantially pure *bifidus* flora forms within 48 hours and at any rate within 96 hours in the intestine of most of the tested infants, the tested food-preparation contains the aforesaid sufficient amount of *bifidus* factor, it being taken for granted that the bacteria flora of the faeces is a reflection of that of the intestine.

The present invention consists of a method of producing a food-preparation and has the feature that such a quantity of a *bifidus*-active concentrate, as defined above, is added to a food-stuff as to produce a *bifidus*-active food-preparation, as defined above. For example, a sufficient quantity of *bifidus*-active concentrate is added to *bifidus*-milk. In a preferred form of the invention, a *bifidus*-active food preparation with a lactose-albumin quotient in excess of 2.6 is produced. For example, such a preparation is produced on the basis of milk, e. g. concentrated or dried milk, by adding such a quantity of lactose as to make the lactose-protein quotient higher than 2.6. If desired, other digestible carbohydrates may be added during the production process.

The lactose-protein quotient of a food-preparation is calculated by dividing the total weight of lactose by that of the protein. In such preparations, lactose may in part be replaced by dextrine. In this event, the lactose-dextrine/protein quotient should exceed 3. In a preferred form of the invention, *bifidus*-active food-preparations are produced having added to its substances used in paediatry, for example vitamins, lactic acid, salts or fats.

The invention further concerns a method of producing a *bifidus*-active concentrate. According to this method a lactose-conversion product is produced by subjecting a lactose solution to a pH-treatment above 5 for such a time and subsequently raising the concentration of the *bifidus* factor whilst separating non-converted lactose, to such a degree as to obtain a *bifidus*-active concentrate, as defined above. In order to obtain a *bifidus*-active concentrate the lactose solution should contain a buffer during said pH-treatment at a pH between 5 and 9.

For men of the art the aforesaid tests are a basis permitting a suitable choice of the conditions under which the method according to the invention is carried out.

In connection with the aforesaid method of producing a lactose-conversion product, reference is made to a publication of Edna Montgomery and Hudson in "Journal of Am. Chem. Soc." vol. 52 p. 2101 to 2106 (1930) describing a treatment of an aqueous lactose solution with a 0.04 n. calcium hydroxide solution followed by separation of the lactose formed in carrying out this method. In this publication it is not stated that the materials or concentrates obtained by means of the method referred to therein have *bifidus*-activity or may be used for producing a *bifidus*-active food-preparation in the aforesaid sense. For the sake of completeness it is pointed out that applicant does not claim exclusive rights for the method described in said publication of Montgomery and Hudson.

It is advisable to carry out the pH-treatment at a temperature between room temperature and 150° C. and to choose the pH-value higher according as the temperature is lower. It has been found that the rate of reaction of the formation of the bifidus factor at a higher pH-value is higher than in the case of a lower pH-value under otherwise similar conditions.

The pH of the solutions may be adjusted in a suitable manner, for example by choosing a suitable buffer mixture.

In a preferred form of the invention the alkaline treatment of lactose is carried out in an aqueous solution. For preparing a bifidus-active concentrate various lactose-containing liquids enter into account, for example deproteinised whey or concentrated aqueous lactose-solutions which do not contain or substantially not contain other materials.

It has been found that a satisfactory yield of bifidus-active concentrate is obtainable after 1 to 5 days' standing of an aqueous lactose solution having a pH of 10 to 13 at a temperature between 20° C. and 40° C. and by increasing the concentration of bifidus factor in the solution thus obtained.

According to a further method, an aqueous lactose solution is set aside for at most five hours at a pH of 6 to 9 at a temperature of 110° C. to 120° C. and subsequently concentrated.

If the pH-treatment is carried out at approximately 12, it is advantageously set with such a quantity of calcium hydroxide that deposit thereof is present in the solution during the pH-treatment.

According to a special form of the invention, the pH-treatment is carried out with an aqueous lactose solution containing small quantities of salt by passing it through an alkaline ion-exchanger.

If at the end of the pH-treatment the pH of the solution exceeds 9 the value thereof is preferably reduced by neutralisation to a value of about 7.

In order to make the lactose solution subjected to the pH-treatment into a bifidus-active concentrate, non-converted lactose should be removed from the solution, as stated above. This may, for example, be effected by concentrating the solution by evaporation and by filtering off the formed lactose precipitate. The concentration of bifidus-factor may further be increased by treating the liquid, from which considerable quantities of non-converted lactose have already been removed, with a liquid which is soluble in the solution and in which lactose is sparingly soluble, for example lower aliphatic alcohols, especially ethyl alcohol of 96%.

After removing non-converted lactose from the solution, a still stronger concentration of bifidus factor is obtainable by percolating the solution with a liquid wherein the bifidus factor is sparingly soluble but several impurities of the factor are readily soluble, for example ethers such as di-ethyl ether, di-isopropyl ether or esters, for example ethyl acetate and furthermore petroleum ether. The bifidus factor may be further concentrated by subsequently percolating the solution with a liquid, for example lower aliphatic alcohols such as methyl-, ethyl- or propyl alcohol, wherein the bifidus factor dissolves more easily than its impurities of this factor.

Good results are further obtainable by applying a solution, from which considerable quantities of lactose have already been removed, on to a granular, chemically inert material, for example river- or sea sand, drying it in vacuo and extracting the mass thus obtained with liquids dissolving the bifidus factor. Especially, absolute ethyl alcohol enters into account for this purpose.

*Example 1*

11.2 kg. of lactose were dissolved in boiling main water. To the clear solution so much water was added that a volume of 56 l. was obtained. This solution was heated to its boiling point. After that the hot solution was warmed for one hour in an autoclave at 110° C. After cooling the liquid was concentrated by evaporation in vacuo to a volume of 15 l. To the turbid liquid were added 25 l. of ethyl alcohol of 96%, whilst stirring vigorously. The lactose precipitate obtained was sharply filtered off and again washed with ethyl alcohol of 96%, the alcoholic solution being concentrated by evaporation in vacuo to a volume of 2 l. The precipitate mainly consisted of lactose. The filtrate was treated with di-ethyl ether for 12 hours in a percolator and then the percolated liquid, after removal of the ether in vacuo, was shaken with 100 g. of adsorption carbon. After removing the carbon, a bifidus-active concentrate was left. The concentration of the bifidus factor therein was increased by freeing the solution from salt by means of ion-exchangers. Subsequently the solution was concentrated by evaporation in vacuo to form a thickly liquid syrup which was applied on to 5 kg. glowed river sand, the whole subsequently being dried to a constant weight in a vacuum desiccator. The mass was then crushed and extracted with 6 l. of boiling abs. ethyl alcohol while stirring for 15 minutes. The sand was filtered off hot and again washed with boiling abs. ethyl alcohol. The material precipitated from the alcoholic extract was highly bifidus-active.

*Example 2*

205 g. KH₂PO₄, 318 g. Na₂HPO₄ and 11.2 kg. lactose were dissolved in boiling water, diluted with water to a volume of 56 l. and then heated to the boiling point. The hot solution was introduced into an autoclave, heated therein at 110° C. and set aside for one hour at this temperature. After cooling, the solution was concentrated by evaporation in vacuo to a volume of 12 l. The liquid was inoculated with a small quantity of lactose whilst stirring, lactose then tending to crystallize, the crystallisation being substantially completed after twelve hours. The precipitate was filtered off and the filtrate was slowly mixed, while stirring vigorously, with 30 l. of ethyl alcohol of 96%. After approximately 12 hours the mixture separated into a syrupy layer and an upper clear liquid which was decanted. The alcoholic solution was concentrated by evaporation in vacuo to a volume of 2 l., the concentrate subsequently being treated for 12 hours with di-ethyl ether in a percolator, the ether then being distilled off in vacuo. The residue was shaken for 1 hour with adsorption carbon, the carbon subsequently being filtered off. The concentrate thus obtained was bifidus-active.

*Example 3*

11.2 kg. lactose were dissolved in 56 l. boiling main water to which, after cooling, 560 g. slaked lime were added, the solution being set aside for 2 days at room temperature. The undissolved calcium hydroxide was filtered off and the dissolved hydroxide was precipitated with carbon dioxide, the precipitate being filtered off. The solution thus neutralised was concentrated by evaporation to a volume of 12 l., inoculated with lactose and the lactose-precipitate formed after 14 hours was filtered off, the filtrate being concentrated by evaporation in vacuo to form a thickly liquid syrup. Each 2 l. of this syrup were mixed with 6 l. of ethyl alcohol of 96%. The precipitate formed after 24 hours was separated and the filtrate was concentrated by evaporation in vacuo to 2 litres. The concentrate thus obtained was percolated for 12 hours with ethyl acetate, the ester then being removed by evaporation in vacuo and the residue being shaken for one hour with adsorption carbon. The concentrate obtained after filtering off the carbon was bifidus-active.

*Example 4*

11.2 kg. lactose were dissolved in 56 l. water. After adding 224 g. sodium hydroxide dissolved in little water to the cold solution, the solution thus obtained was set aside for 3 days at room temperature. The solution was subsequently freed from salt by passing it over ion-exchangers. The salt-free liquid was concentrated by evaporation in vacuo to a volume of 10 l. The lactose precipitate was filtered off after two days, and the filtrate was concentrated by evaporation in vacuo to form a thickly liquid syrup. To each 2 l. of this syrup were added 6 l. of ethyl alcohol of 96%, thus again obtaining a lactose precipitate which was filtered off. The alcoholic filtrate was concentrated by evaporation and subsequently treated with di-ethyl ether and adsorption carbon, similarly to the foregoing examples. The concentrate thus obtained was bifidus-active.

*Example 5*

11.2 kg. lactose were dissolved in such a quantity of boiling main water as to obtain an end volume of 18.7 l. To this solution were added 120 g. new-slaked lime while stirring vigorously and then the mixture was allowed to cool. By means of oxalic acid the pH was subsequently brought to a value of approximately 7, the calcium oxalate precipitate being filtered off and the liquid thus treated being set aside for several days at room temperature. The lactose precipitate thus obtained was filtered off and the filtrate was concentrated by evaporation in vacuo to form a thickly liquid syrup. The liquid thus obtained was inoculated with lactose and set aside at room temperature for several days, the lactose precipitate then being filtered off. The filtrate was worked up to a *bifidus*-active concentrate, as described in the foregoing examples.

What is claimed is:

1. A method of making a food preparation adapted to form within 96 hours substantially pure *L. bifidus* flora in the intestines of an infant fed therewith comprising mixing with an edible food product a quantity of a lactose conversion product sufficient to form said flora when the lactose-protein quotient of the resultant food product is at least equal to a value exceeding 2.6.

2. A method of making a food preparation adapted to form within 96 hours substantially pure *L. bifidus* flora in the intestines of an infant fed therewith comprising mixing with milk a quantity of a lactose conversion product and lactose sufficient to increase the lactose-protein quotient of the milk to a value exceeding 2.6, the lactose conversion product being added in a quantity sufficient to form said flora at said quotient.

3. A food-preparation adapted to form within 96 hours substantially pure *L. bifidus* flora in the intestines of an infant fed therewith comprising an edible food product having mixed therewith a lactose conversion product in an amount sufficient to form said flora when the lactose-protein quotient of the resultant food product exceeds 2.6.

4. A food preparation adapted to form within 96 hours substantially pure *L. bifidus* flora in the intestines of an infant fed therewith comprising an edible food product containing protein, lactose and a lactose-conversion product in which the lactose-protein quotient is in excess of 2.6 and the lactose-conversion product is present in an amount sufficient to form said flora at said quotient.

References Cited in the file of this patent

UNITED STATES PATENTS

| | | |
|---|---|---|
| 2,694,640 | Gyorgy et al. | Nov. 16, 1954 |
| 2,697,663 | Tomarelli et al. | Dec. 21, 1954 |
| 2,708,165 | Gyorgy et al. | May 10, 1955 |
| 2,710,806 | Gyorgy et al. | June 14, 1955 |
| 2,710,807 | Gyorgy et al. | June 14, 1955 |

OTHER REFERENCES

Proc. of Soc. Exptl. Biol. & Med., volume 80, No. 3, December 1952, pages 712–715.

JACS 52, pages 2101–2106.

UNITED STATES PATENT OFFICE

CERTIFICATE OF CORRECTION

Patent No. 2,811,450                                                            October 29, 1957

Friedrich Petuely

It is hereby certified that error appears in the printed specification of the above numbered patent requiring correction and that the said Letters Patent should read as corrected below.

Column 1, line 66, after "sufficient quantity." insert the following paragraph:

The expression "lactose conversion product" is defined as the product obtained by subjecting an aqueous solution of lactose to a pH treatment in excess of 5 at a temperature between room temperature and 150° C., said temperature being increased as the pH of the solution is decreased, removing the non-converted lactose and concentrating the converted product.

Signed and sealed this 7th day of January 1958.

(SEAL)
Attest:

KARL H. AXLINE                                                      ROBERT C. WATSON
Attesting Officer                                               Commissioner of Patents